United States Patent

Leih et al.

[11] Patent Number: 5,960,365
[45] Date of Patent: Sep. 28, 1999

[54] SIMULTANEOUS REGISTRATION IN MULTIPLE OVERLAPPING DOMAINS

[75] Inventors: George Leih, Voorschoten; Willem Gerard Levelt, The Hague, both of Netherlands

[73] Assignee: Koninklijke PTT Nederland N.V, Groningen, Netherlands

[21] Appl. No.: 08/940,728

[22] Filed: Sep. 30, 1997

Related U.S. Application Data

[63] Continuation of application No. 08/592,360, filed as application No. PCT/EP94/02860, Aug. 31, 1994, abandoned.

[30] Foreign Application Priority Data

Aug. 31, 1993 [NL] Netherlands .......................... 9301492

[51] Int. Cl.[6] ................................ H04B 7/26; H04Q 7/20
[52] U.S. Cl. .................... 455/552; 455/426; 455/432; 455/435; 455/515
[58] Field of Search ................................ 455/403, 422, 455/426, 432, 434, 435, 551, 552, 553, 414, 417, 415, 463, 515, 516, 186.1, 425, 443, 576; 379/357

[56] References Cited

U.S. PATENT DOCUMENTS

| | | | |
|---|---|---|---|
| 4,734,928 | 3/1988 | Weiner et al. | 379/59 |
| 4,876,738 | 10/1989 | Selby | 455/54.1 |
| 5,003,629 | 3/1991 | Ness-Cohn et al. | 455/56.1 |
| 5,020,091 | 5/1991 | Krolopp et al. | 379/58 |
| 5,101,500 | 3/1992 | Marui | 379/60 |
| 5,259,018 | 11/1993 | Grimmett et al. | 455/89 |
| 5,301,359 | 4/1994 | Van Den Heuvel et al. | 455/552 |
| 5,329,578 | 7/1994 | Brennan | 379/59 |
| 5,428,666 | 6/1995 | Fyfe et al. | 455/33.1 |
| 5,437,053 | 7/1995 | Sawa et al. | 455/54.1 |
| 5,442,806 | 8/1995 | Barber et al. | 455/33.1 |
| 5,448,622 | 9/1995 | Huttunen | 379/59 |
| 5,613,213 | 3/1997 | Naddell et al. | 455/54.1 |
| 5,657,374 | 8/1997 | Russell et al. | 455/422 |

FOREIGN PATENT DOCUMENTS

| | | |
|---|---|---|
| 92/08326 | 5/1992 | WIPO . |
| 92/19078 | 10/1992 | WIPO . |
| 93/16549 | 8/1993 | WIPO . |

OTHER PUBLICATIONS

Bernardi, "Internetworking: The Key PCs Success Factor", IEEE Global Telecommunications Conference, GlobeCom '91, Phoenix, vol. 3, pp. 1904–1911, Dec. 1991.

*Primary Examiner*—Reinhard J. Eisenzopf
*Assistant Examiner*—Lester G. Kincaid
*Attorney, Agent, or Firm*—Michaelson & Wallace; Peter L. Michaelson; Michael P. Straub

[57] ABSTRACT

System for mobile communication, comprising a mobile station (1) and a communication domain (A) comprising at least one base station, which communication domain (A) overlaps another communication domain (B) at least partially, a mobile station (1) being functionally divisible into a plurality of virtual stations (1A, 1B) and each virtual station being assigned to a communication domain. Preferably, the mobile stations are designed for a plurality of users (u1, u2, u3). The system may be arranged for assigning to a mobile station a plurality of virtual stations which each support one or more user-service-pairs.

25 Claims, 2 Drawing Sheets

SIMULTANEOUS REGISTRATION IN MULTIPLE OVERLAPPING DOMAINS

CROSS REFERENCE TO RELATED APPLICATION

This application is a continuation of patent application Ser. No. 08/592,360, filed Jan. 23, 1996, now abandoned, entitled, Mobile Communication System with Overlapping Domains, which is a 371 of PCT/EP94/02860, filed Aug. 31, 1994.

BACKGROUND OF THE INVENTION

The invention relates to a system for mobile communication, comprising at least one mobile station and a communication domain having at least one communication station, which communication domain overlaps another communication domain at least partially. Such a system is known in practice.

In systems for mobile communication it is possible to set up, within a certain communication domain, a communication link between a mobile station and one or more communication stations of said communication domain. In this respect, such a communication domain, hereinafter also referred to as domain, may comprise a country, a region or, for example, only a factory site. The extent of a communication domain is determined by the range of the communication stations present in said domain. Said communication stations may comprise so-called base stations, but may also be constituted by e.g. satellites. In this text, the term base station will be used in the most general sense, i.e. meaning communication station in general and including satellites and other communication means.

Within a domain, mobile communication in two directions is, in principle, possible for a user registered therein via the base stations of said domain. In this connection, on the one hand, a mobile station can contact a base station in order to set up a link in this way and, on the other hand, a base station can contact a mobile station located in the domain concerned and registered therein. Registration of a (mobile) station in a particular domain thus allows (the network of) that domain to reach said station and vice versa. Registration, in this context, therefore comprises not only the notification (registration proper) allowing a domain to reach a mobile station, but also the recording of the availability of a domain in a mobile station, thus allowing a mobile station to reach a domain.

In practice, different domains will coincide completely or partially and therefore overlap. Thus, in regions in the vicinity of country borders, domains of the different countries will have a certain overlap, and the relatively small communication domain of a factory site may fall within the communication domain of the country concerned. In the case of overlapping communication domains, however, a number of problems arise with existing systems for mobile communication, as will be explained in greater detail below.

Within the overlapping areas, it is possible, in most cases, for a mobile station to communicate with any desired domain of the overlapping domains. If the mobile station is communicating with one of the domains or is at least registered therein, communication with and/or registration in the remaining domains is, however, no longer possible and said station has become inaccessible for said remaining domains. It will be clear that this is undesirable in many cases.

Usually a mobile station is assigned to a single user. The registration of the mobile station in a domain then has the result that said one user can be accessed by other users on said mobile station and, for his part, he can reach others. In some systems for mobile communication, however, it is possible to register a plurality of users with the aid of one mobile station. As a result, said users can all be reached on the respective mobile station registered, for its part, in the domain and they can reach other users from there. In this case, however, the problem arises that the mobile station is registered in only one domain and that the users of said mobile station can therefore only access one domain at a particular instant. Although it is therefore possible in existing systems to register a plurality of users via one mobile station, it is not possible to register said users simultaneously in different domains.

Prior Art techniques, as described in the references below, do not offer a solution to the above-mentioned problems.

WO-A-93 16549 discloses a communication system in which a mobile station can place and receive telephone calls in both a cordless and a cellular telephone system. The mobile station has a separate telephone number for each system, call routing priority being established for the relative numbers. An incoming call will first be routed to the system associated with the respective number and then, if necessary, be re-routed. This may result in the so-called "tromboning effect", causing an inefficient use of the network facilities. Furthermore, this known system does not provide for multiple users of a single mobile station. Moreover, the "domains" disclosed in this prior art reference have different technologies, i.e. cordless and cellular, while the mobile station has a different telephone number for each technology (domain). Also, the mobile station of said reference does not support multiple users and/or services.

U.S. Pat. No. 5,003,629 discloses the use of a single subscriber identification for a plurality of RF communication systems. A centralized database is provided for converting system-dependent identifications into universal identifications. This has the disadvantage that for large numbers of mobile stations and/or subscribers a very large database is required. In case several databases are used, the identifiers may differ between databases, thus counteracting their uniqueness. Moreover, this known system does not allow for multiple users and services being supported by a single terminal.

WO-A-92 19078 discloses a method in mobile telephone systems in which a subscriber identity module (SIM) is allocated at least two identities, one of which is activated by the user. The two or more identities pertain to business and private calls, or to different potential users, but not to different domains. Only one identity can be used at a time in this prior art technique.

NL-A-93 01494 describes a system for mobile communication arranged for selecting an available communication domain on the basis of a preference list.

WO-A-92 08326 discloses a method for a communication unit to operate in either a trunking communication system or a cellular communication system, where the trunking and cellular systems overlap. This known method comprises the monitoring of the control channel of the other system in order to change affiliation. However, only one affiliation at a time can be supported.

SUMMARY OF THE INVENTION

It is an object of the invention to eliminate the above disadvantages and other disadvantages of the prior art and to provide a system for mobile communication in which a mobile station can be registered in a plurality of domains simultaneously. It is a further object of the invention to provide a system for mobile communication in which a station is accessible from a plurality of domains simultaneously. It is also an object of the invention to provide a system for mobile communication in which a single station can support a plurality of user-service-pairs, each user being able to utilize a service in a selected domain. In addition, it is an object of the invention to provide a system for mobile communication with which it is possible to arrange for changeovers between communication domains to proceed unnoticeably for the user. It is yet a further object of the invention to provide a mobile station for use in the said system. It is still a further object of the invention to provide a system for mobile communication in which the domains are mutually independent.

For this purpose, the system according to the invention is characterized in that a mobile station is arranged for simultaneously supporting a plurality of virtual stations, each virtual station being constituted by a data table comprising data identifying the virtual station, data identifying a particular domain, and data concerning the communication with said domain; said data identifying the virtual station being related to data identifying a user. In this way a mobile station is arranged for simultaneously supporting a plurality of virtual stations, each virtual station allowing a group of users to register in a particular communication domain for a set of services. In other words, for each domain, a virtual (mobile) station can be generated which belongs to said domain and represents a certain physical mobile station. Because a mobile station according to the invention can register user-service-pairs in each of a number of overlapping domains, the mobile station can offer links to a plurality of domains at the same time, for a plurality of users or for a single user. Thus, according to the invention, the mobile station can be considered as functionally divisible into a plurality of virtual stations, each virtual station being assigned to a communication domain and each virtual station supporting a set of services for each user of a group of users.

As a mobile station can be registered in several domains, a virtual station being registered in each domain, an incoming call can be passed directly to the station via the appropriate domain, without the need to re-route the call as is often required in prior art systems. Furthermore, the virtual stations allow the use of a single identification for a user, irrespective of the particular domain. In the system according to the invention there is accordingly no need for a conversion of the access numbers in a centralized database, as suggested in Reference [2]. Especially in the case of large numbers of subscribers, the absence of the need for a centralized conversion greatly simplifies the communication system.

It should be noted that the terms "virtual (mobile) station" and "virtual (mobile) terminal" (abbreviation: "VT") will be used interchangeably in this text.

The system according to the invention is preferably designed so that a mobile station is arranged for use by a plurality of users. As a result, a plurality of users can communicate via a common station or via the station of another user, with the result that it is possible to be a user of the system without having one's own mobile station. In this case, provision can also be made for a "mobile" station to be located at a fixed point where it is available to various users who are possibly mobile themselves.

If a mobile station is available to a plurality of users, the system according to the invention may be arranged to assign one virtual station to each user, the above-mentioned group of users associated with a virtual station consisting of a single user. As each virtual station can be recognized as such by a domain, a simple and efficient identification of the users is possible, thus facilitating the routing of incoming calls.

If the system supports a plurality of communication services, such as (normal) telephony, videophony and fax, it may advantageously be designed to assign to a user a plurality of virtual stations which support various services. This results in a number of user/service pairs which are each associated with a separate virtual station, the above-mentioned set of services associated with a virtual station consisting of a single service. By providing, for every service, a separate virtual station for each user, a functional separation of the various services can be achieved both in the domain (and the network thereof) and in the mobile station, with the result that the various services can operate independently of one another. This is especially advantageous if overlapping domains do not support the same services. In this connection, it is, of course, also possible to utilize separate virtual stations for different services in such a way that the virtual station of a particular service is shared by a plurality of users.

Preferably, the system according to the invention is designed to allocate an identification to each virtual station, which identification is unique within a domain. As a result, an unambiguous identification of the virtual stations is obtained which simplifies the calling of a user associated with a virtual station.

Although it is possible within a domain, as stated above, for a plurality of virtual stations of a mobile station to be associated with said domain, it is possible to implement the system so that precisely one virtual station is assigned in a mobile station to each domain within which the mobile station is located. In this way, with a minimum number of virtual stations, the possibility is provided for a mobile station to be registered in a plurality of domains.

The system according to the invention is preferably implemented so that, on leaving a domain, a virtual station assigned to said domain is discontinued. This releases capacity in the mobile station and in the domain for generating other virtual stations. Virtual stations can be discontinued by merging virtual stations, that is to say by combining characteristics of a plurality of virtual stations. Similarly, virtual stations can be generated by splitting existing virtual stations.

Preferably, the system according to the invention is arranged for UMTS ("Universal Mobile Telecommunication System") use. The system may, however, also be used for other communication systems.

A mobile station for use in a system according to the invention preferably comprises means for supporting a plurality of virtual stations, said means comprising memory means containing a data table comprising data identifying a virtual station, data identifying a particular domain, and data concerning the communication with said domain; said data identifying the virtual station being related to data identifying a user.

REFERENCES

[1] WO-A-93,16549
[2] U.S. Pat. No. 5,003,629
[3] WO-A-92,19078
[4] NL-A-93,01494 & WO-A-95,07010
[5] WO-A-92,08326

BRIEF DESCRIPTION OF THE DRAWING

The invention will be explained in greater detail below with reference to the Figures.

DETAILED DESCRIPTION OF THE DRAWING

Figure 1:
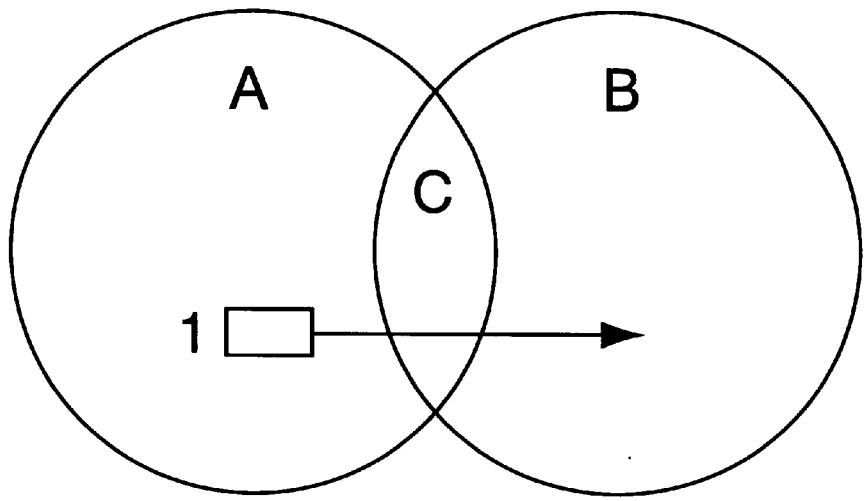
FIG. 1 shows schematically two partially overlapping communication domains.

FIG. 1 shows schematically a first communication domain A and a second communication domain B. The area where the two communication domains overlap is indicated by C. Located in the communication domain A is a mobile station 1 which is moving in the direction of the domain B, as indicated by the arrow. Fixed base stations and exchanges (not shown), respectively, are located in the domains A and B.

In the situation shown communication will be possible between the mobile station 1 and the domain A. As soon as the mobile station moves into the area C (and therefore also into the domain B) communication will be possible with either the domain A or the domain B. If the mobile station 1 follows its path and leaves the area C, communication will be possible solely with the domain B. If a communication link has to be maintained with the mobile station 1, on leaving the area C, the communication with the domain A should be severed whereas the communication with the domain B has to be set up.

As stated above, in the area C, communication is possible with the domain A and with the domain B. With existing systems for mobile communication, registration is possible only in one of said domains simultaneously. A choice will therefore have to be made, and registration in one domain rules out registration in the other domain. For various purposes, it would, however, be desirable for the mobile station to be registered in both domains simultaneously.

The possibility of registering the mobile station 1 in a plurality of domains simultaneously and for it therefore to be able to be in communication with a plurality of domains at the same time, is provided, according to the invention by dividing up the mobile station functionally into a plurality of virtual stations which are each assigned to a particular communication domain. This is explained schematically in FIG. 2.

Figure 2:
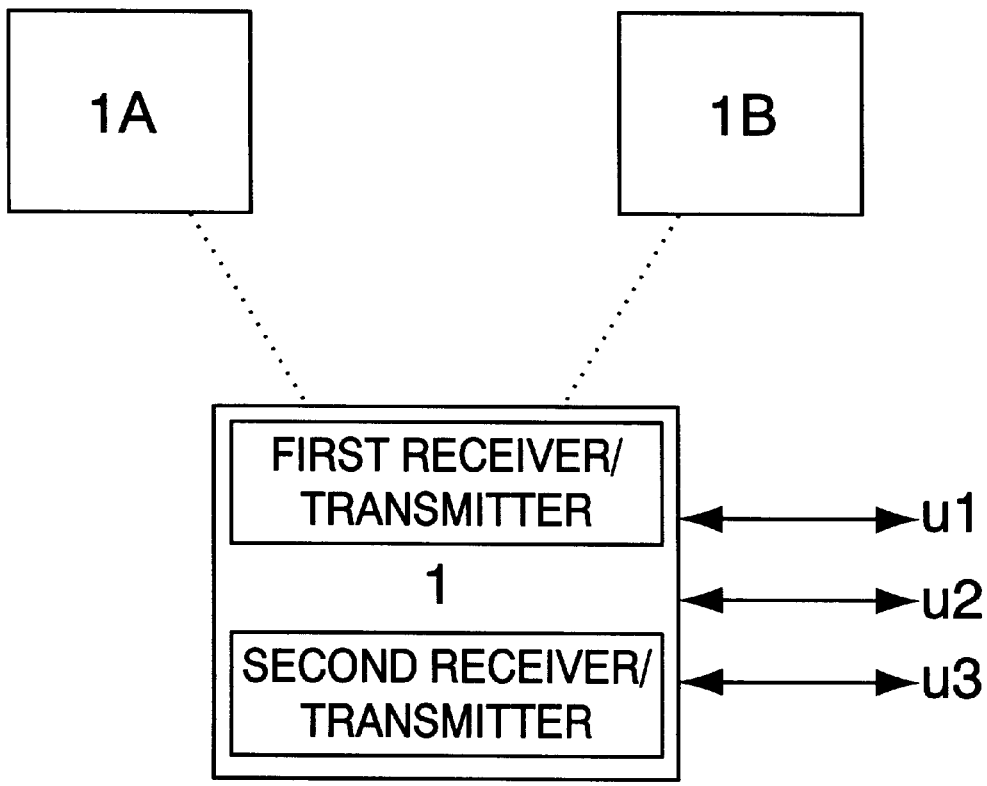
FIG. 2 shows schematically a physical mobile station and two virtual mobile stations.

FIG. 2 shows the mobile station 1 which, in the example shown, simulates two virtual (mobile) stations 1A and 1B. The physical mobile station 1 generates, as required, virtual stations 1A, 1B, etc. Thus, the (physical) mobile station 1, if it is located in the domain A (see FIG. 1), will comprise solely the virtual station 1A. On entering the area C, the mobile station 1 can generate the virtual station 1B. After leaving the area C in the direction of the arrow, the virtual station 1A is no longer necessary, with the result that it can be discontinued. Said discontinuation of virtual stations which are not used or not needed has the advantage that this releases capacity (such as memory capacity) in the physical mobile station. It is obvious that, for example, in the case of a plurality of overlapping domains, a plurality of virtual stations can also be generated.

As shown in FIG. 2, a plurality of users u1, u2, u3 may be registered in a mobile station. By assigning, according to the invention, a plurality of virtual stations to a single mobile station, it is possible for various users to be connected to various domains, possibly for different services, via a single mobile station. Thus, referring to FIG. 2, the user u1, for example, can communicate via the virtual station 1B with domain B while the users u2 and u3 are registered in the domain A via the virtual station 1A. It is also possible to register a user, for example u1, in two domains simultaneously via the virtual stations 1A and 1B, with the result that said user is accessible from both domains simultaneously. This simultaneous registration in more than one domain may involve a single service or a set of services, different services being registered in different domains. However, it is also possible for a user to register the same service in several domains.

A virtual station fulfils all the functions of a standard mobile station with respect to the communication system, with the result that there appears to be no difference between an "actual" (physical) and a virtual mobile station for the purpose of the functioning of the communication system per se and of the base stations. Within a communication system or within a domain, both standard mobile stations and mobile stations which, in accordance with the invention, are represented by means of virtual stations can therefore be used.

Figure 3:
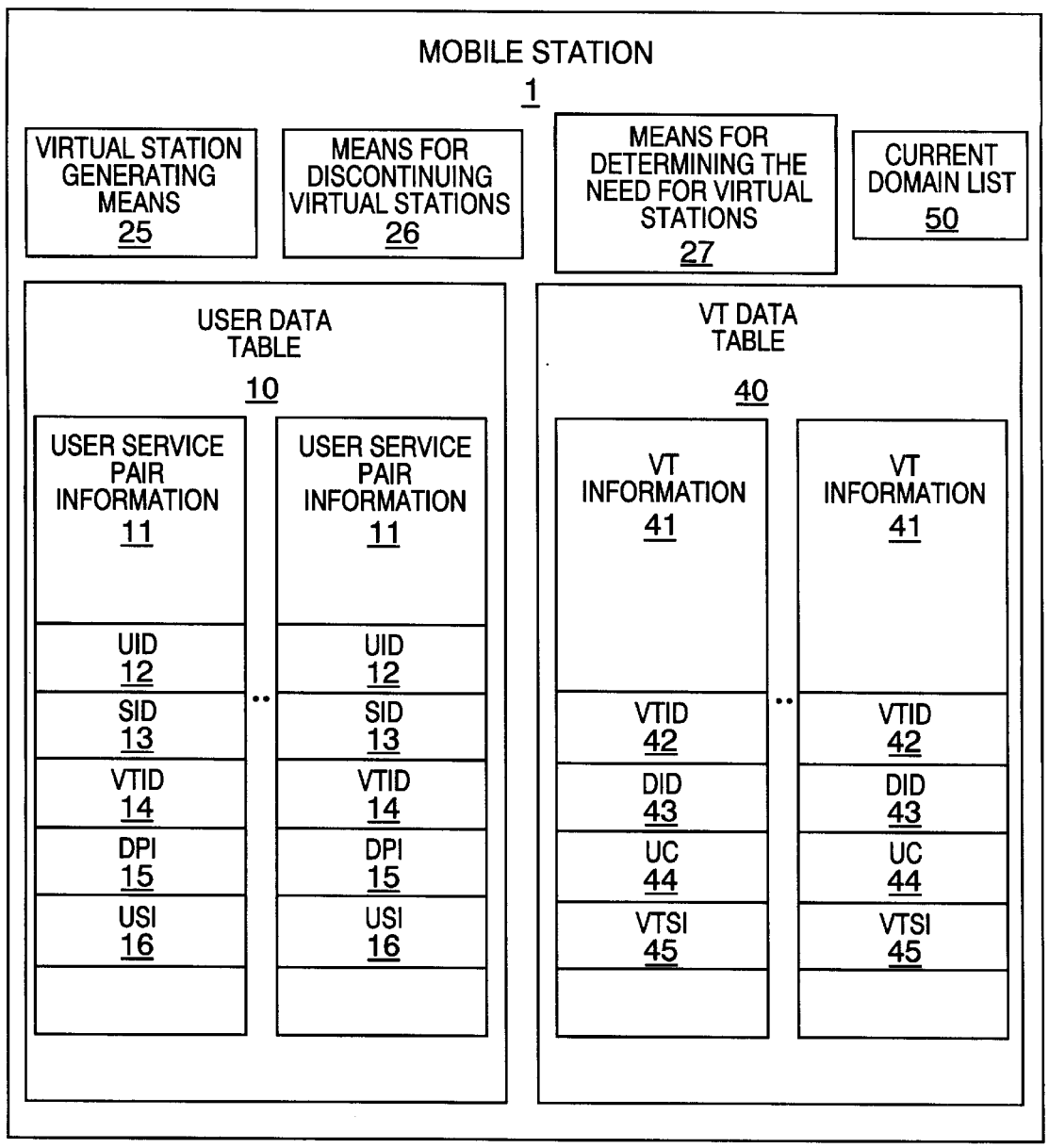
FIG. 3 is a more detailed schematic illustration of the physical mobile station of the present invention.

From the above it will be clear that the term "virtual station" (or "virtual terminal") indicates a logical or functional (mobile) station which is embodied by the actual (physical) mobile station. The mobile station according to the invention is provided with suitable means for creating virtual stations, i.e. means for handling the data structures constituting virtual stations. Thus, the mobile station may contain, for example, suitable software which controls the station so that a portion of the memory present in the station and transmission/reception capacity is reserved for a particular virtual station. Advantageously, the system is implemented so that, after leaving the area associated with said station, a virtual station is discontinued. This has the advantage that capacity in the physical station is thereby released in order to generate other virtual stations. A physical mobile station, as illustrated in FIG. 3, therefore comprises, inter alia, means for generating virtual stations 25, means for discontinuing virtual stations 26 and means for determining the need for virtual stations 27. This need can be determined on the basis of, for example, the position and direction of movement of the mobile station and/or the wishes of users registered for said mobile station. In this connection, use may advantageously be made of a preference list which indicates the domain or the domains to which a user is, if possible, preferably connected for a particular service or set of services (cf. Reference [4]).

In a preferred embodiment of the invention, the physical terminal (mobile station) stores two main data tables: a user data table 10 and a VT data table 40. The former table 10 contains information 11 on user-service-pairs, while the latter table contains information on VTs. For each user-service-pair (USP), the following information may be stored in a user data table 40:

User Identification (UID) 12
Service Identification (SID) 13
VT Identification (VTID) 14
Domain Preference Information (DPI) 15
User Specific Information (USI) 16

The UID and SID fields contain e.g. identification codes identifying the particular user and service. The VTID field may be used to identify the VT or VTs the USP is registered in, while the DPI contains, for example, a ranked list of domain identifiers indicating which domains are most preferred. The USI field contains additional information, e.g. encryption keys to encrypt and/or decrypt the communication of the user. It should be noted that the abbreviation SID as used here means Service Identification, not Subscriber Identity Device as is often meant in telecommunication literature.

For each VT 1A, 1B which is used, i.e. to which at least one USP is assigned, a VT table 40 may contain:

Virtual Terminal Identification (VTID) 42
    Domain Identification (DID) 43
    Usage Count (UC) 44
    Virtual Terminal Specific Information (VTSI) 45

The DID field may contain an identifier, such as a number, to identify the domain in question, while the VTID 42 uniquely identifies the virtual terminal registered in the domain in question. In the UC field, the number of user-service-pairs (USPs) using the VT in question is recorded, provided this number may be greater than one in the specific embodiment. The VTSI 45 contains all information necessary to handle the communication with the particular domain. This information may comprise the exact point of attachment in the domain, encryption keys to encrypt and/or decrypt information transmitted via the terminal, etc.

In addition to the above-mentioned information, the terminal keeps track of all currently available domains, i.e. all domains the terminal can communicate with at a certain point in time. This information may be stored in a current domain list (CDL) 50.

In order to use a mobile station, a prospective user registers on the station (terminal), supplying the following information: User Identification (UID), Service Identification (SID) and Domain Preference Information (DPI). This information may be input using a card (smart card or magnetic card), a keyboard or both. Part of this information, such as the DPI, may be (semi-)permanently stored in the terminal. On registration, the terminal will:

1. determine the most preferred domain, using the user's preference list (DPI) and the list of available domains (CDL);
2. create a new virtual terminal (VT), assuming that no VT was in existence at the moment of registration for this particular domain;
3. increment the usage count (UC) if the newly registered user-service pair makes use of an existing VT associated with a particular domain;
4. register the user in the preferred domain in the conventional way.

This concludes the registration, thus enabling the user to communicate using the terminal.

In order to cancel the registration (de-register) in a domain, the user supplies his user identification (UID) and the particular service identification (SID), whereupon the terminal will:

1. determine, using the user data table, which VT is used for the registration;
2. de-register the user using this VT in the associated domain;
3. remove the registration information from the user data table; and
4. decrement the usage count (UC) of the VT. When the UC reaches the value 0, the relative VT entry in the VT table is removed, thus discontinuing the VT in question.

In the above it is assumed that a VT may support more than one user-service pair. If a single user-service-domain combination is assigned to each VT, the VT in question will be discontinued upon receipt of the relative request.

In order to effect domain updates, the (physical) terminal may periodically monitor its radio interface, checking the accessibility (reachability) of domains. The domains which can be reached may be recorded in a reachability list (RL). After compiling a new RL, the terminal:

1. checks whether the current domain list (CDL) and the RL contain the same domains, and ends the update if this is the case;

2. copies the (new) RL into the CDL.

On the basis of the new CDL and the users' preference lists, registrations and de-registrations may be performed, and new virtual terminals may be created if new registrations in new domains are necessary. Similarly, existing VTs may be found to be superfluous (its user has obtained registration in a more preferred domain) and may be discontinued.

In the domains, information relating to physical terminals is recorded per VT. This information may include an identifier of the terminal, its communication wavelength, its so-called point of attachment, its status (busy/not busy), etc. Furthermore, the domains may store tables containing the association between user-service-pairs and their respective VTs.

A virtual terminal may be arranged to support a single service-user-pair or multiple pairs. If a single VT supports all user-service-pairs of a terminal in a particular domain, the domain in question can more easily detect that a terminal is busy if an incoming call is received for that particular terminal. Also, all procedures involving the physical terminal, e.g. location updates and attach/detach procedures, only need to be executed once in the domain in question, thus serving all user-service-pairs.

The procedures described above serve to illustrate the invention and are given by way of example only. Other ways of executing such procedures involving the use of virtual terminals may also be implemented. An example of the processing of an incoming call will be described below.

In order to be able to receive incoming calls, the user (say user u1) must make its location known to the system by means of registration. This registration is done in a particular domain (say domain D1) as described above. When another user (say user u2) makes a telephone call to user u1, the location is known to be domain A. This locating may be performed exactly like in conventional systems, taking into account that the location of the user is dependent on the particular service requested.

Then, the call can be routed to domain A. In domain D1, the virtual terminal associated with this particular user-service-pair is retrieved from the data stored in the domain (the table with information on the association between VTs and user-service-pairs). The domain can subsequently establish contact with the VT in a conventional way, that is, by sending one or more paging messages, using the VTID to identify the terminal. The physical terminal, receiving paging messages the conventional way, checks the VTID contained in the message sent to verify if the message is in fact meant for the terminal in question. When this is the case, the terminal will make contact with the domain, making use of the VT. Next, the call set-up, the active call phase and the call release can proceed in a conventional manner.

The above-mentioned paging can be realized in several ways. Advantageously, a (physical) mobile terminal is provided with an additional receiver or transceiver to support paging, thus providing an extra channel. Alternatively, the regular transceiver can be used to provide an additional paging channel, or to allow paging on the regular communication channel or channels, e.g. by using normally unused bandwidth, by multiplexing paging and communication messages, etc.

It will be clear from the foregoing that the invention offers numerous advantages. For example, if a mobile station moves across boundaries of domains, it is very desirable for the user or users of said mobile station not to be impeded by the changeover from one domain to the other. With a system according to the invention, it is possible for a user not to notice this changeover at all, as a virtual terminal associated with the next domain can be established before leaving the present domain, and the two virtual terminals can be incorporated in the same physical terminal, thus assuring a smooth transition between the virtual terminals and their associated domains.

It should be pointed out that the changeover to another domain should be distinguished from the changeover to another base station in the same domain, the so-called "hand over" of a mobile station to a subsequent base station. It is furthermore pointed out that the domains A and B may be provided in practice with a plurality of base stations. In the system according to the invention, each mobile station is therefore advantageously provided with means for selecting a suitable base station. Furthermore, the different users of the same physical terminal can use the domain of their own choice for each service they wish to use, not being restricted to one domain and not being restricted to by the other users utilizing the same terminal. Additionally, in a system according to the invention, the domains a physical terminal (station) is associated with are mutually independent.

It will be understood by those skilled in the art that the invention is not limited to the examples described above and that many additions and modifications are possible without departing from the scope of the present invention. Thus, as already stated above, the "mobile" station may in fact be fixed. According to the invention, however, such a station will always be capable of simulating one or more virtual stations, as a result of which such a station will be accessible from and will have access to plurality of communication domains at the same time.

We claim:

1. A method of implementing a mobile communication station for use in a mobile communication system, the mobile communication system including a plurality of communications domains, the method comprising the steps of:
   storing information in a single physical mobile station, for each one of a plurality of virtual stations, the information stored for each one of the plurality of virtual stations including:
      i. data identifying the virtual station;
      ii. user identifying data which identifies a user associated with the virtual station;
      iii. data identifying a particular domain associated with the virtual station;
   the stored user identifying data identifying a plurality of different users, each of the different users being associated with at least one of the plurality of virtual stations;
   utilizing the stored information to generate the plurality of virtual stations using the single physical mobile station, the step of utilizing the stored information including the step of registering different virtual stations included in the plurality of virtual stations in different domains so that the virtual stations of the single mobile communication station are simultaneously registered in, and can be simultaneously accessed from, multiple domains; and
   using the single physical mobile communication station to simultaneously communicate with a plurality of said multiple domains using virtual stations associated with different users.

2. The method of claim 1, wherein the information stored for each one of the plurality of virtual stations further includes service identification information, the user identification and service identification information associated with each of the virtual stations representing user service pair information.

3. The method of claim 2, wherein the step of storing information includes the step of storing the data identifying a user, service and domain, associated with a particular one of the virtual stations, in a user data table.

4. The method of claim 3, further comprising the step of:
   storing domain preference information in the user data table.

5. The method of claim 4, further comprising the step of:
   storing user specific information in the user data table.

6. The method of claim 4, further comprising the step of:
   allocating a unique identifier to each one of the plurality of virtual stations within a communication domain.

7. The method of claim 6, further comprising the step of:
   assigning precisely one virtual station in the single physical mobile station to each one of a plurality of domains in which the single physical mobile station is located.

8. The method of claim 7, wherein the step of assigning precisely one virtual station involves the step of reserving memory capacity, the method further comprising the step of:
   discontinuing a virtual station assigned to a domain upon leaving said domain thereby releasing reserved memory capacity for use in generating other virtual stations.

9. The method of claim 8,
   wherein the step of assigning precisely one virtual station further involves the step of reserving transmission/reception capacity; and
   wherein the step of discontinuing a virtual station assigned to a domain upon leaving said domain further involves the step of releasing said transmission/reception capacity for use in generating other virtual stations.

10. The method of claim 8, further comprising the step of arranging the single physical mobile telephone station for use in a Universal Mobile Telecommunication System.

11. The method of claim 7, further comprising the step of:
    discontinuing a virtual station assigned to a domain upon leaving said domain, the step of discontinuing a virtual station including the step of removing information from the user data table.

12. The method of claim 1, wherein the information stored for each one of the plurality of virtual stations further includes service identification information and domain preference information.

13. The method of claim 1, further comprising the step of including in the mobile communication station first and second transceivers.

14. A mobile physical communication station, comprising:
    means for storing information within the mobile physical communication station corresponding to each one of a plurality of virtual stations;
    information, stored in the information storing means, said information including data identifying a plurality of virtual stations and a plurality of different users each of the different users being associated with a separate one of the plurality of virtual stations, said information further including data identifying a plurality of domains, one of the plurality of domains being associated with each one of the virtual stations; and
    means for utilizing the stored information to generate the plurality of virtual stations for the plurality of different users and for registering different virtual stations, included in the plurality of virtual stations, in different domains so that at least some of the virtual stations, of the single mobile communication station, which are associated with different users, are simultaneously registered in, can be simultaneously accessed from, and can simultaneously communicate with multiple domains.

15. The mobile physical communication station of claim 14, wherein the stored information further includes:

data associated with each one of the plurality of virtual stations identifying a service associated with the associated virtual station.

16. The mobile physical communication station of claim 15, wherein the stored information further includes:

data associated with each one of the plurality of virtual stations identifying a domain preference.

17. The mobile physical communication station of claim 16, wherein the means for storing information includes a user data table.

18. The mobile physical communication station of claim 14, wherein the means for utilizing the stored information include:

first and second receivers.

19. The mobile physical communication station of claim 18, wherein the second receiver supports paging.

20. The mobile physical communication station of claim 14, wherein the means for utilizing the stored information include:

first and second transceivers.

21. The mobile physical communication station of claim 20, wherein the second transceiver supports paging.

22. A method of implementing a mobile communication station for use in a mobile communication system, the mobile communication system including a plurality of communications domains providing the same type of communication service, the method comprising the steps of:

storing information in a single physical mobile station, for each one of a plurality of virtual stations, the information stored for each one of the plurality of virtual stations including:
i. data identifying the virtual station;
ii. user identifying data which identifies a user associated with the virtual station;
iii. data identifying a particular domain associated with the virtual station;

the stored user identifying data identifying a single user associated with multiple virtual stations, each of the multiple virtual stations being associated with a different domain which provides the same type of service to said single user;

utilizing the stored information to generate the plurality of virtual stations using the single physical mobile station, the step of utilizing the stored information including the step of registering different virtual stations included in the plurality of virtual stations in different domains so that the virtual stations of the single mobile communication station are simultaneously registered in, and can be simultaneously accessed from, multiple domains; and using the single physical mobile communication station to simultaneously communicate with a plurality of said multiple domains using virtual stations associated with said single user to thereby simultaneously provide the same type of communication service to the single user via multiple domains.

23. The mobile physical communication station of claim 22, wherein said type of communication service is a cellular telephone communication service.

24. A mobile physical communication station, comprising:

means for storing information within the mobile physical communication station corresponding to each one of a plurality of virtual stations;

information, stored in the information storing means, said information including data identifying a plurality of virtual stations and a user associated with each one of the plurality of virtual stations, said information further including data identifying a plurality of different domains used for providing the same type of communication service, one of the plurality of domains being associated with each one of the virtual stations; and means for utilizing the stored information to generate the plurality of virtual stations and for registering different virtual stations, included in the plurality of virtual stations, in different domains so that at least some of the virtual stations of the single mobile communication station, are simultaneously registered in, and can be simultaneously accessed by said user from, multiple domains used to provide the same type of communication service to said user.

25. The mobile physical communication station of claim 24, wherein said type of communication service is a cellular telephone communication service.

* * * * *